(12) United States Patent
Pasic (10) Patent No.: US 11,772,022 B1
(45) Date of Patent: Oct. 3, 2023

(54) RESONANT HEAT, DUST AND FOG SCRUBBER

(71) Applicant: Hajrudin Pasic, Tracy, CA (US)

(72) Inventor: Hajrudin Pasic, Tracy, CA (US)

(\*) Notice: Subject to any disclaimer, the term of this patent is extended or adjusted under 35 U.S.C. 154(b) by 26 days.

(21) Appl. No.: 16/933,305

(22) Filed: Jul. 20, 2020

(51) Int. Cl.
| | | |
|---|---|---|
| *B01D 46/00* | (2022.01) | |
| *B01D 53/26* | (2006.01) | |
| *B01D 49/00* | (2006.01) | |
| *B01D 45/04* | (2006.01) | |
| *B01D 45/02* | (2006.01) | |
| *B01D 47/06* | (2006.01) | |
| *B01D 50/40* | (2022.01) | |
| *E03B 3/28* | (2006.01) | |

(52) U.S. Cl.
CPC ......... *B01D 46/0053* (2013.01); *B01D 45/02* (2013.01); *B01D 45/04* (2013.01); *B01D 47/06* (2013.01); *B01D 49/00* (2013.01); *B01D 50/40* (2022.01); *B01D 53/26* (2013.01); *E03B 3/28* (2013.01)

(58) Field of Classification Search
CPC ........ B01D 53/26; B01D 45/02; B01D 45/04; B01D 46/0052; B01D 46/0053; B01D 46/0054; B01D 46/0056; B01D 47/06; B01D 49/00; B01D 50/40; E03B 3/28; E01H 13/00; B03C 3/017; B03C 3/16
See application file for complete search history.

(56) References Cited

U.S. PATENT DOCUMENTS 10,625,197 B2 \* 4/2020 Pasic ...................... B01D 47/02

\* cited by examiner

*Primary Examiner* — Gabriel E Gitman (57) ABSTRACT

Vibrator is used to move circular strings in a harp-like screen to achieve frequencies corresponding with one of the natural frequencies of the strings as well as with the frequencies of gas vortices shedding off the strings in order to more efficiently: a) scrub particulates/droplets (solid or liquid) from the gas, b) exchange and utilize energy between the oncoming cold or hot gas and a liquid flowing down the screens in order to heat or cool the liquid, and c) agitate and, without clogging, more efficiently remove the liquid film streaming down the strings, i.e., to increase the sliding efficiency of the liquid flowing down the strings. With the strings vibrating in the resonant regime, particulate capture and energy and mass transfer are substantially enhanced compared to non-resonant, passive systems in which strings do not vibrate, or where vibrations are induced solely by the gas flow.

17 Claims, 6 Drawing Sheets

RESONANT HEAT, DUST AND FOG SCRUBBER

FIELD OF THE INVENTION

The present invention relates to a method and a device functioning in accordance with the method, which device can be used as a heat exchanger and for removal of liquid or solid particulates from gasses traversing through it.

BACKGROUND

Harp-like screens have been utilized for extraction from flowing-through gasses of both liquid and solid particulates, as well as for heat-exchanging between such gasses and liquids flowing down the screens.

Large portion of the world population suffers from water scarcity. In arid regions fog harvesting is used for obtaining water by utilizing a variety of vertical wire meshes turned against wind and on which 3- to 50-micron water droplets coalesce, accumulate, and are captured upon sliding down into containers. Meshes with small openings are the efficient means but are prone to clogging caused by formation of large droplets, as well as re-entrainment. This problem may be partly resolved by replacing conventional meshes with an array of parallel vertical strings—a harp-like assembly (Ref. 1: W. Shi et al, *Fog Harvesting with Harps*, Applied Materials Interfaces, 2018, 10, 11979-11986) and also using hydrophobic coatings of wires, resulting in a threefold enhancement in the capturing rate. Increasing water droplets' "sliding efficiency" and their capture efficiency requires reduction of strings' diameter to as little as 0.25 mm, which in turn leads to a reduction of structural integrity of the harp. However, clogging and re-entrainment issues still persist and the overall efficiency of these "passive" technologies is only up to about 10%, without any evident prospects for further sizable improvements.

Recently, it was proposed that more efficient fog harvesting be done by first charging the water droplets (Ref 2: M. Darnak, K. Varanasi, *Electrostatically Driven Fog Collection Using Space Charge Injection*, Science Advances, Vol. 4, No. 6, 2018), similarly to charging solid particulates in electrostatic precipitators (ESPs), followed by their capture by abovementioned harp-like screens. However, local clogging and reduced sliding efficiency resulting from strong attracting electrostatic forces exerted on captured droplets by strings persists. In addition, high cost and a likelihood of significant electrical shorting caused by a high-voltage field in a wet setting are serious impediments.

Regarding capture of solid particulates ESPs and scrubbers, among other particulate-capturing devices, are used for treating harmful pollutants and solid-particulate emissions that would otherwise remain in the air.

In addition to discharging harmful particulates, many industrial processes discharge exhaust into the environment at an elevated temperature and recovering this low-quality but quantitatively substantial energy in many technological processes provides for an opportunity to improve the efficiency of such industrial processes.

Wet ESPs (WESPs) can both remove particulates and recover thermal energy by utilizing cleaning water (used to clean particulate deposited on collection electrodes) heated by the oncoming gas being cleaned, which water is then directed through a heat exchanger and cooled down before returning to the precipitator.

There is broad scientific evidence that the most intensive both heat and mass transfer between the oncoming gas and the fluid/water flowing down the strings takes place in the so-called lock-in, i.e., resonant regime, in which frequencies of gas vortices shedding off the smooth circular vibrating cylinders (e.g., strings) coincide with the natural frequencies of the cylinders (Ref. 3: T. S. Pottebaum, M. Gharib, *Using Oscillations to Enhance Heat Transfer for a Circular Cylinder*, International Journal of Heat and Mass Transfer, 49 (2006), 3190-3210). Recently, it has been proposed (U.S. Pat. No. 10,625,197 B2) that the exhaust gas in various industries be cleaned by capturing the solid particulates without charging them, by passing them through a set of vibrating wet harp-like strings whose vibrations are self-induced, i.e., induced solely by the gas stream, leading to exclusion of transformer/rectifier units, discharge electrodes, and the corresponding control equipment and maintenance. However, as it is explained below, this "passive" technology lacks an indispensable external control of key operating parameters influencing the particulate capture efficiency.

Although preliminary tests conducted with strings vibrating even in non-resonant conditions have shown encouraging results (Ref. 4: M. Ali et al., *Performance Evaluation of Novel Wet Vibrational Precipitator*, Journal of the Air & Waste Management Association, Volume 69, 2019, Issue 6, pp. 743-751), achieving the desired resonant conditions solely by the self-induced vibrations is rarely attainable since natural frequencies of the strings in this "passive" system are typically much lower than the vortex shedding frequencies (Ref 4) and some external forcing mechanism needs to be implemented in order for the two frequencies to match.

Therefore, a need exist for novel, non-passive methods and devices capable of operating in the optimal, resonant setting that would significantly enhance scrubbing of the particulates, either solid or liquid, as well as heat exchange between the traversing gasses and a liquid flown along the strings.

BRIEF SUMMARY OF THE INVENTION

The objective of this invention is to induce forced vibrations of strings of harp-like screen or screens made of circular strings (wires, cords, coated wire ropes) and set perpendicularly to the gas flow, said gas flow being either naturally (i.e., wind, etc.) or artificially displaced (e.g., exhaust, etc.) and passing through the screen or screens, while using vibrators to move the strings at desired frequencies corresponding with one of the natural frequencies of the strings as well as with the frequencies of gas vortices shedding off the strings in order to more efficiently: a) scrub particulates/droplets (solid or liquid) from the gas, b) exchange and utilize energy between the oncoming cold or hot gas and a liquid flowing down the screens in order to heat or cool the liquid, and c) agitate and, without clogging, more efficiently remove the liquid film streaming down the strings, i.e., to increase the sliding efficiency of the liquid flowing down the strings. With the strings vibrating in the resonant regime, particulate capture and energy and mass transfer are substantially enhanced compared to passive systems in which strings do not vibrate at all, or where vibrations are solely induced by the gas flow and the unit operates in a non-resonant regime.

The new technology can be utilized, for example, in fog harvesting, in extracting water from cooling towers' plumes, it can be combined with existing ESP and WESP technologies to collect dust and extract heat from the particulate-laden hot gas, including those for fog harvesting suggested in Ref. 2, in HVAC systems, in cleaning dust from dirt air in road and railroad tunnels, and in various other applications.

BRIEF DESCRIPTION OF DRAWINGS

Some embodiments of the present invention are illustrated as an example and are not limited by the figures of the accompanying drawings.

DETAILED DESCRIPTION

Figure 1:
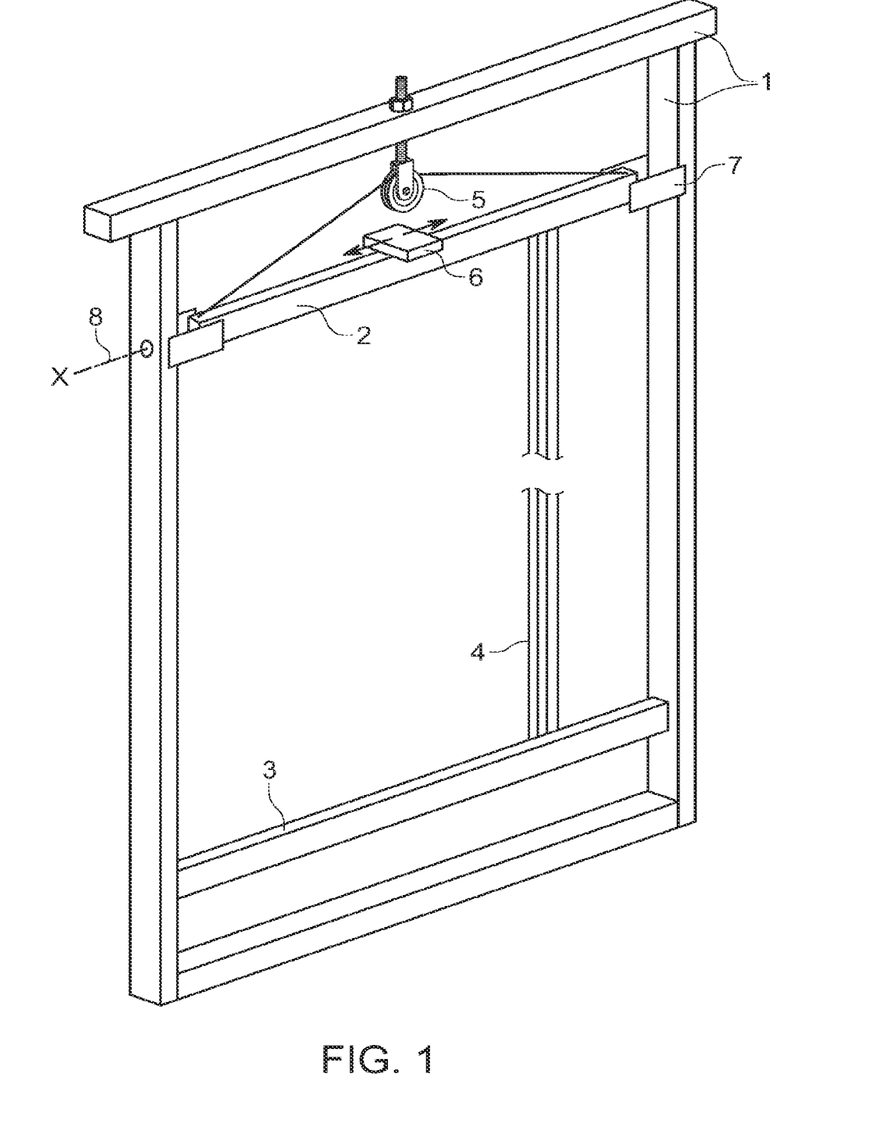
FIG. 1 is a perspective view of the exemplary embodiment of a single assembly of a scrubber for treating an oncoming gas, with a vibrator mounted on one of the beams forcing the strings to vibrate in the direction perpendicular to the oncoming gas flow (henceforth, numbers indicating elements depicted in various figures are bold and italicized).
Figure 2:
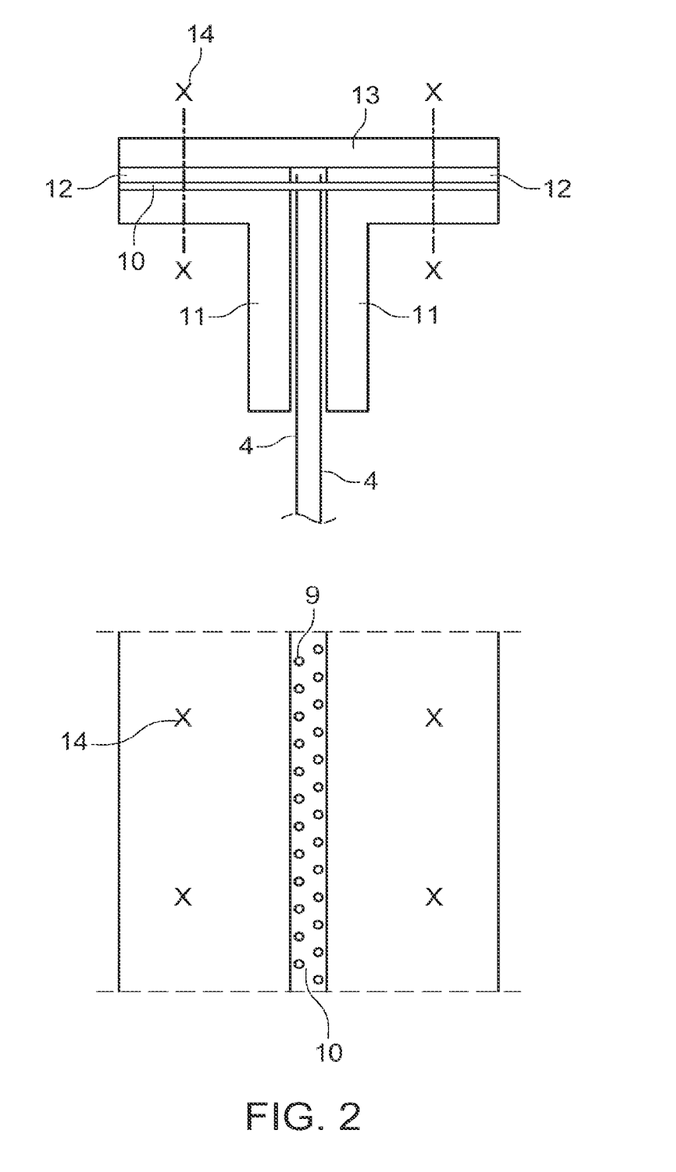
FIG. 2 depicts a configuration of beams 2 and 3 of FIG. 1.

FIG. 1 illustrates a typical assembly of the resonant scrubber. Depending on application, a scrubber may have two or more such assemblies installed across gas flow in a single row or in two or more rows, such as in the WESP in FIG. 4, for example. The assembly consist of frame 1, upper 2 and lower 3 beams used to suspend strings 4, pulley 5 with appertaining rope attached to the beam 2 and suspended on the frame 1 by the screw and the nut used to set the strings 4 in desired tension, vibrator 6 mounted on beam 2 to set it in latitudinal vibrating motion, guides 7 to suppress the lateral motion of beam 2, and screw 8 to set the maximum vibration amplitude of beam 2 to be equal to the desired value E (defined below). Instead of using pulley 5 assembly to suspend beam 2, it is obvious that other options to do it are possible. Beams 2 and 3 have the same cross section as described in FIG. 2. Beam 3 is rigidly attached to frame 1. Strings 4 are mounted in one or more staggered rows such that strings in a given row are in the middle of those in the neighboring rows, as illustrated in FIG. 2. Beam 2, together with the strings' upper ends is forced to perform small longitudinal vibrations by the vibrator 6 rigidly attached to it as depicted in FIG. 3; its typical displacements are smaller than a millimeter.

FIG. 2 describes how beams 2 and 3 are assembled and how strings 4 are suspended on them. On both beams, strings 4 are passed on a floor through staggered holes 9 of commercially available perforated strip(s) 10 and then steel angles 11, two slabs 12 and 13 are used to hold composite beams 2 and 3 assembled using screws 14. To secure structural integrity, depending on tension force imposed on strings and number of string rows (FIG. 2, for illustration, shows two), a plurality of identical perforated strips 10 with aligned holes 9 can be used on both beams 2 and 3.

Figure 3:
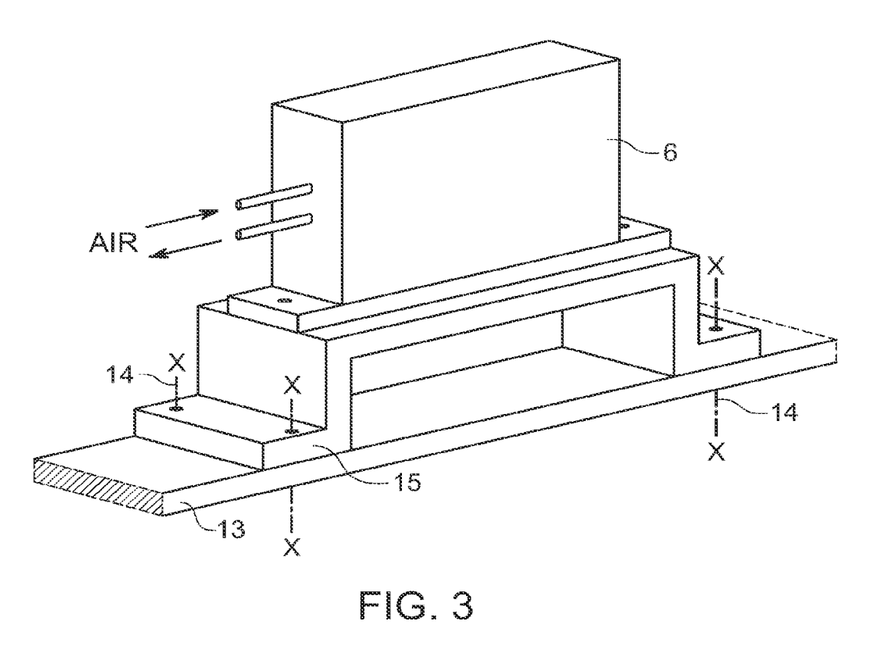
FIG. 3 depicts the vibrator mounted on beam 2.

FIG. 3 shows how a turbine pneumatic vibrator 6 could be attached to slab 13 using the bracket 15; it is typically located in the middle of beam 2. Shown in FIG. 3, for illustration purposes, is a pneumatic turbine vibrator; other types of vibrators could be similarly attached as well.

Vibrators 6 are pneumatic or electric, although other vibrators capable of operating at high frequencies and delivering sufficient forces can be used. Pneumatic turbine vibrators are operated by compressed air, typically at 40-80 psi. They can quietly operate at 60-70 dB at adjustable speeds/frequencies, as high as 766 Hz (at 46,000 rpm), running in a three-year continuous duty, with no lubrication. They are small in size, 4-6 inches. Typically, the air is delivered by a compressor at the rate of 4-40 cfm and the maximum pressure of about 175 psi. These vibrators can produce a considerable force; for example, when operating at 58 psi, at 15,500 rpm, with air consumption of 7 cfm, model GT16-S produced by Findeva Co. produces a force of 428 lb. At a lower frequency range, pneumatic linear vibrators can be used too.

Long-lasting air delivery, with a minimal service, could be secured with so-called reciprocating compressors. They are durable, easy to service and operate, with typical power of 5-10 hp. To secure continuous operation, such as in ESP applications, duplex compressors could be used, i.e., two compressors sharing the same air tank and possibly each one connected to a different vibrator.

Electric vibrators, AC or DC, possibly battery-operated, run at somewhat lower frequencies than the pneumatic ones, typically less than 160 Hz.

Figure 4:
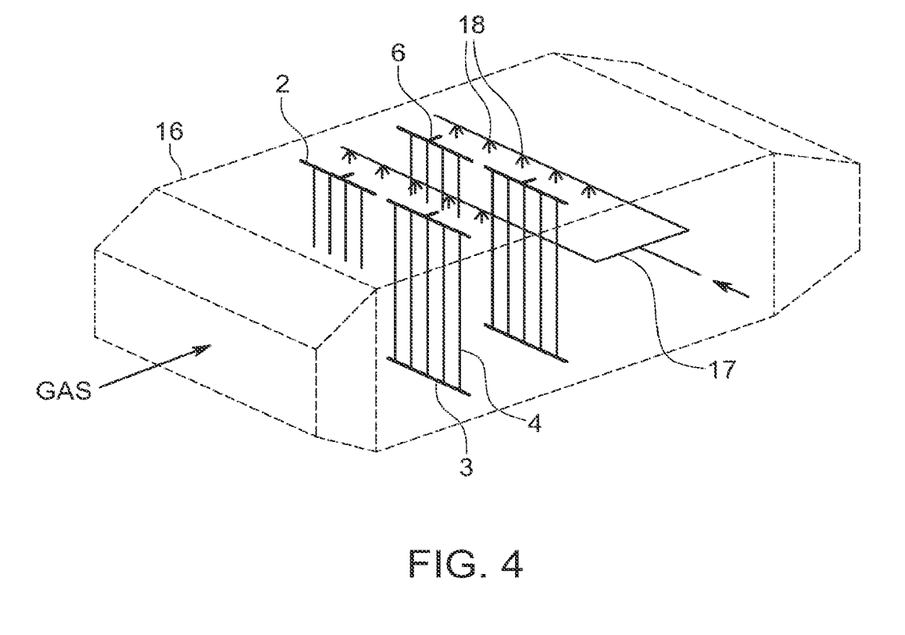
FIG. 4 is a perspective view of a WESP having a plurality of assemblies, with water-delivery sprays.

FIG. 4 is a perspective view of a WESP having a plurality of assemblies, with water-delivery sprays. Assemblies are mounted in the conduit 16 through which treated gas flows. Strings are kept wet at all times and occasionally flashed by a liquid, normally water, delivered by the system of pipes 17 and spray-nozzles 18. Liquid, together with dust and other pollutants seized from the gas flows down the strings into hopper (not shown) mounted at the bottom of the conduit 16 and could be filtered and recycled.

Regarding various applications, in fog harvesting, for example, the air laden with water droplets is passed through the harp and the captured water falls due to gravity down into a collector (not shown in FIG. 1). Another important application can be in cross-flow cooling towers of power and nuclear plants, where huge amount of water can be extracted from plumes by passing them through assemblies like those in FIG. 1; otherwise the plumes would end up in the atmosphere.

In heat scrubbing, hot or cold liquid is running down the strings, exchanging heat in direct contact with the oncoming cold or hot gas, unlike in most less efficient conventional heat exchangers where such a contact is nonexistent. As an example, in WESPs, cold water can be used to extract the heat from the particulate-laden hot gas, such as illustrated in FIG. 4.

Particulate and heat/energy scrubbings can be combined as well, such as in WESPs in FIG. 4, where clean cold water flowing down the harps extracts both heat and the particulates from the oncoming hot gas. The polluted hot water is then collected in the hopper beneath, which water can be filtered and recirculated through conventional heat exchangers to be reused to clean the harps over again.

Figure 5:
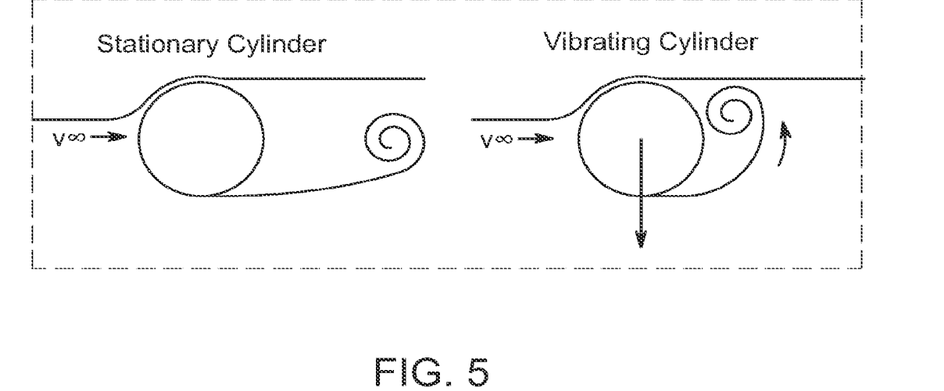
FIG. 5 schematically presents particulate- and heat-scrubbing mechanism.

In the course of scrubbing, treated gas is passed through the set of vibrating strings; depending on application, their diameter is about 0.3 to 3 mm, and the length in the range of 1 to 10 m. Due to inertia, large particles/droplets mostly travel on almost straight trajectories and are intercepted and captured by strings in the next row or rows, while smaller particles are taken by the flow around strings. Unlike stationary strings, gas vortices alternately formed on and detached off the vibrating strings, first on one side and then on the other, do not continue their motion on straight lines but are swayed behind the strings in the direction opposite of that of strings' motion, FIG. 5, causing frequent contacts between the particulates and the wet strings and hence enhancing both particulates growth through coagulation and their capture on strings. In the case of heat scrubbing, when the assemblies are used to exchange heat between two different-temperature media, this vibration promotes more intense heat transfer through direct contact between the gas and the liquid film. Helped by gravity, small-amplitude, high-frequency vibrations also promote sliding efficiency of the liquid and matter collected on the strings.

In scrubbing solid particles, strings are kept wet by a supply of liquid —typically water but, depending on application, not excluding other media—where such a liquid can be used as a catalyzer, for example. Cleaning liquid can be delivered from a container mounted on the top of screens or sprayed by nozzles mounted on one or more horizontal pipes, such as shown in FIG. 4. Continuous string vibrations, helped by gravity will dispense the flow down the strings.

It is well known that heat transfer and water vapor diffusion are best enhanced, up to 34%, if the string is oscillating near the Strouhal frequency (Ref. 3: T. S. Pottebaum and M. Gharib, *Using Oscillations to Enhance Heat Transfer for a Circular Cylinder*, Int'l J. of Heat and Mass Transfer, 49, (2006), pp. 3190-3210), particularly in vibrations characterized by small amplitude/diameter ratio A/D<0.8, typical of higher modes, i.e., high-frequency vibrations. In this regime vortices formed behind the string have short formation length, i.e., they form very near string surface, and are therefore effective in heat and mass water vapor diffusion and formation of the wet "curtain", which plays the key role in particulate capture as well. Pottebaum and Gharib's experimental study (Ref. 3) showed that the enhancement in heat transfer was found to strongly depend on synchronization with harmonics of the natural shedding frequency, the cylinder/string wake mode, and the cylinder's transverse oscillating velocity. It was found that the increase in heat transfer is achieved at higher resonant frequencies as well; in particular, there was a large increase in heat transfer at approximately three times the vortex shedding frequency for amplitude ratio of 0.1. Also, there were large increases at approximately two and three times the frequency for an amplitude ratio of 0.2. All these fine tunings can be achieved by using vibrators.

Although the increase in heat transfer happened when the wake was in a state of synchronization with the oscillating frequency, the increase in heat transfer was essentially found to correlate inversely with the distance at which vortices roll up. As a result of the shortening of eddy formation region, the stagnant and low heat-convecting fluid at the rear of the cylinder is refreshed (Ref. 6: H. G. Park, M. Gharib, 2001, *Experimental Study of Heat Convection from Stationary and Oscillating Circular Cylinder in Cross Flow*, J. of Heat Transfer, 123, (2001), pp. 51-62).

Particulate capture efficiency and efficiency of heat and mass transfer are enhanced at higher gas velocities, stemming from higher vortex shedding frequencies and higher accelerations/forces exerted on vibrating wet strings. Hence, in scrubbing solid particulates, dimensions of the locked-in scrubber can be reduced to the size of the existing ducts, upstream of ESPs, or slightly bigger, instead of expanding ducts, which is done in conventional ESPs in order to reduce flow velocities and increase dust residence time. The compact size of the locked-in scrubber makes it a potential candidate for numerous smaller particulate-control installations in a variety of industrial and other applications. In WESP applications wherein the gas is supersaturated by cooling down as it passes between the strings, condensation occurs on the particulates and they increase in size. Increasing the size of the particulates is an effective means for improving particulate collection by both coagulation and impaction.

Fundamental, first-mode transverse vortex-induced vibrations normally occur when vortex shedding frequency $f_s$=U St/d locks onto the cylinder natural frequency $f_n$. It happens over the range $4<U/f_s$ d<8 (Ref. 7: Blevins, R. D. Flow-Induced Vibration, Van Nostrand Reinhold, New York, 1990), where U is gas velocity between the strings, d is string's diameter and St=$f_s$ d/U is Strouhal number; in a large range of turbulent flow conditions around a cylinder St=0.2. Smaller vibrations also occur out of that range, in higher vibration modes, i.e., at multiple resonant frequencies (Ref. 7). In reality, achieving lock-in conditions and hence the best results is rarely possible, unless externally generated, forced vibration are employed. For illustration, gas velocities in a horizontal-flow WESP are typically between 1.5 and 3 m/s, but since the strings occupy about a half-cross-section (i.e., assuming the open area is about 50%), gas velocity between the strings is doubled and, in this example, would be U=3 to 6 m/s. Assume further that the strings' diameter is d=0.003 m, using Strouhal number one finds that vortices shed at a frequency $f_s$=200 to 400 Hz. For the strings length L of 3 to 10 meters, assuming that the wet strings' mass is 0.055 kg/m and the imposed tension in the strings varies between S=100 N and even being as high as S=1000 N, natural frequency $f_1$ in the first (half-sine) vibrating mode, calculated from eq. (8) below, is between 2 and 22 Hz, far below the vortex shedding frequency; also see Ref. 4 for another example. Hence the lock-in regime is generally unattainable unless the strings are forced into resonance by some external source.

As illustrated, given gas flow velocity, to bring vibration frequency of the strings close to the vortex shedding frequency of the gas flowing around the strings, i.e., to the lock-in/resonant regime, in absence of an external forcing mechanism, the only parameters that could be adjusted are the string's tension force, its unit weight and its length. However, as it was just illustrated, these parameters cannot be changed much and this makes it impossible to reach the most desired lock-in settings. To overcome these problems, proposed is a resonant scrubber capable of operating precisely in the lock-in regime and in many important applications.

Figure 6:
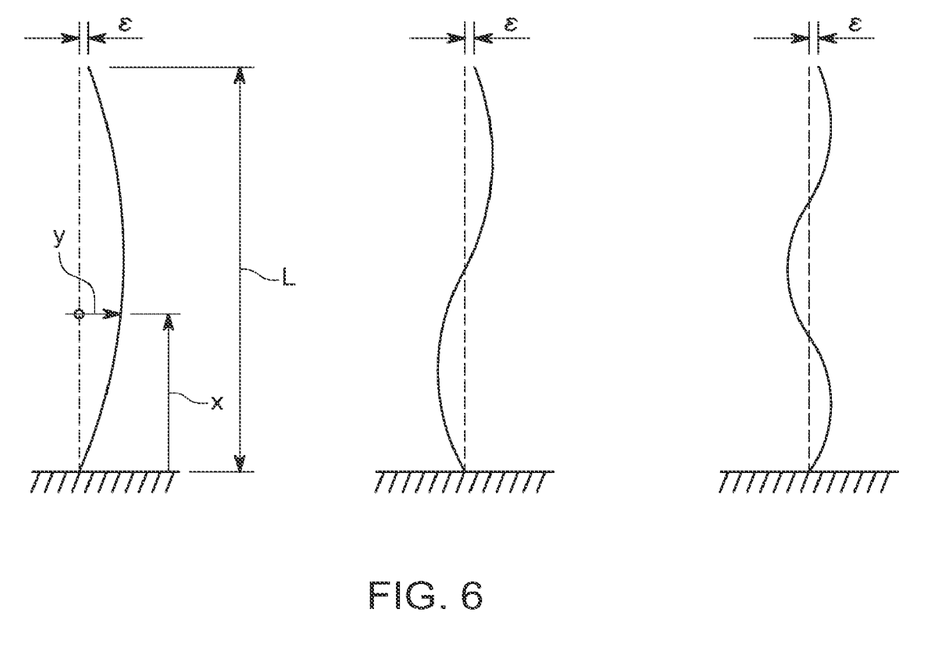
FIG. 6 depicts the first three vibrating modes of the string.

In order to see how the strings are brought to resonance, consider vibration of a single vertical string, FIG. 6, whose length is L, with a mass per unit length m, stretched by force S, fixed at one end (at the bottom, x=0, while the other end at the top x=L), which is forced to vibrate in horizontal direction such that the displacement y at x=L, at instant t is described as (L, t)=ε sin Ωt, where ε is a very small amplitude and Ω is the frequency (measured in radians per second), imposed by the vibrator on the top.

Vibration is described by solving the well-known, homogeneous wave equation (Ref. 8: L. Meirovitch, *Fundamentals of Vibrations*, McGraw-Hill, 2002) and the inhomogeneous boundary conditions described as:

$$S\frac{\partial^2 y}{\partial x^2} = m\frac{\partial^2 y}{\partial x^2} \quad y(0, t) = 0, \quad y(L, t) = \varepsilon \sin \Omega t \qquad (1)$$

and solving (1) for the string deflection y(x, t) at place x in instance t.

First, transformation of coordinates $$y(x, t) = u(x, t) + \frac{x}{L}\varepsilon \sin \Omega t \quad (2)$$

is used to render the inhomogeneous boundary condition in (1) into homogeneous one, such that the new problem to be solved for is $$S\frac{\partial^2 u}{\partial x^2} - m\frac{\partial^2 u}{\partial t^2} = -\frac{m\Omega^2}{L}\varepsilon x \sin \Omega t, \quad u(0, t) = u(L, T) = 0 \quad (3)$$

Inhomogeneous differential equation with homogeneous boundary conditions in (3) can be solved for u(x, t) and then y(x, t) is found from (2).

Of special interest here is the case of resonance in an arbitrary, n-th mode. In that case, solution of (3), satisfying the new boundary conditions, is assumed to have the form $$u_n(x, t) = T_n(t)\sin\frac{n\pi}{L}x = T_n \sin \lambda_n x \quad (4)$$

where $T_n(t)$ is some function of time yet to be found, and $\lambda_n = n\pi/L$.

Function $\sin n\pi/L$ in (4) describes the n-th vibration mode shape. For example, for n=1 the first mode has a half-sine shape with maximum deflection at x=L/2; the second mode n=2 is a full-sine shape with zero deflection at x=L/2 and the maximum deflections of opposite signs at x=L/4 and $$x = \frac{3}{4}L,$$

Using Galerkin method (Ref. 8), after substituting (4) into (3) the error is defined as:

$$e_n(x, t) := \left(-S\lambda_n^2 T_n(t) - m\ddot{T}_n\right)\sin \lambda_n x + \frac{m\Omega^2}{L}\varepsilon x \sin \Omega t \quad (5)$$

where the double dot represents the second derivative with respect to time. Next Galerkin method requires that the error be orthogonal to the modal/trial function in (4) over the domain 0≤x≤L, i.e., that $$\int_0^L e_n(x, t)\sin \lambda_n x \, dx = 0 \quad (6)$$

Introducing damping ratio ç in a standard way (Ref. 8), from (5) and (6) one finds that the $T_n(t)$ must satisfy the differential equation:

$$\ddot{T}_n + 2\varsigma \omega_n \dot{T}_n + \omega_n^2 T_n = -(-1)^n \frac{2}{L}\frac{\Omega^2}{\lambda_n}\varepsilon \sin \Omega t \quad (7)$$

where the string natural frequency in nth mode is defined as $$\omega_n = \frac{n\pi}{L}\sqrt{\frac{s}{m}} \text{ rad/s} \quad (8)$$

In (8), $\omega_n$ is measured in radians/second, while $$f_n = \omega_n/(2\pi) \quad (9)$$

is measured in Hertz (Hz).
Defining the force F and the unit force $F_0$ as $$F(t) = F_0 \sin \Omega t; \quad F_0 = -(-1)^n \frac{2\Omega^2}{n\pi}\varepsilon, \quad N/kg \quad (10)$$

and assuming the non-transient solution to (7) in the form $$T_n(t) = A_{n0}\cos(\Omega t - \varphi) \quad (11)$$

one finds from (7) that the amplitude of vibration is $$A_{n0} = \frac{F_0}{m\omega_n^2\sqrt{\left(1-\left(\frac{\Omega}{\omega_n}\right)^2\right)^2 + \left(2\varsigma\frac{\Omega}{\omega_n}\right)^2}} \quad (12)$$

In case of resonance in the n-th mode, i.e., when $\Omega = \omega_n$, the amplitude is $$A_{n0} = \frac{\varepsilon}{n\pi m \varsigma} \quad (13)$$

From (13), (4), (2), deflection of the string at position x, at instant t, is a summation of the contribution of all the modes n=1, . . . , ∞. Hence:

$$y_n(x, t) = +\frac{x}{L}\varepsilon \sin \Omega t - \sum_{n=1}^{\infty} C_n(-1)^n \frac{\varepsilon}{n\pi m \varsigma}\sin\left(\frac{n\pi}{L}x\right)\cos(\Omega t - \varphi) \quad (14)$$

where $C_n$ is a constant to be found from initial conditions at t=0.

When the string vibrates in resonance in the nth mode, contribution of other modes is none and its response is therefore described as:

$$y_n(x, t) = -(-1)^n \frac{\varepsilon}{n\pi m \varsigma}\sin\left(\frac{n\pi}{L}x\right)\cos(\Omega t - \varphi) + \frac{x}{L}\varepsilon \sin \Omega t \quad (15)$$

The second term in (14) achieves its largest value at x=L, equal to ε. For real values of structural damping ratio ç (in most slender structural elements its value is 0.01-0.05), the first term in (15) is dominant, and hence its largest amplitude is much bigger than ε, even in vibrations taking place in higher modes n>1. Therefore the largest amplitude/deflection in nth mode is approximately $$y_{n max} = \frac{\varepsilon}{n\pi m \varsigma} \quad (16)$$

From (15), the largest slope at the top x=L is found to be $$\frac{dy}{dx} = y' = \tan\theta = \frac{\varepsilon}{L\,m\,\zeta} \approx \sin\theta \quad (17)$$

(since θ is very small and cos θ≈1), such that the horizontal projection of tension force in a single string there is:

$$SH_1 = S\sin\theta \quad (18)$$

The sum of all horizontal projection of tension forces SH in all the strings is obtained by multiplying this value by the number of strings in all rows k, i.e., $SH = k\,SH_1$.

The largest velocity and acceleration are $$v_{n\,max} = y_{n\,max}\Omega, a_{max} = y_{n\,max}\Omega^2 \quad (19)$$

Vibration amplitudes, velocity and acceleration on the top of the strings (at x=L) are found from (15) and are the same for the vibrator and the beam 2 the vibrator is attached to:

$$y_s = \varepsilon, v_s = \Omega y_s = \Omega\varepsilon, a_s = \Omega^2 = y_s = \Omega^2\varepsilon \quad (20)$$

Disregarding vertical translational motion of beam 2, using Newton $2^{nd}$ law, one finds that the necessary force exerted by the vibrator to cause resonant vibration is $$F = m_B a_s + S_H \quad (21)$$

where $m_B$ is the unit mass, kg/m, of beam 2 the vibrator is mounted on.

From (16), it is evident that the maximum deflection is linearly proportional to the perturbing displacement amplitude ε, it is nonlinearly decreased in higher modes by increasing the unit mass of the string and, very important, it is significantly, nonlinearly increased by reducing structural damping caused by internal friction. Hence during resonance very large maximum amplitudes can be reached even in higher modes and even when the driving displacement ε is extremely small, i.e., when a driving force causing the motion, exerted by the vibrator, is small. Very large velocities and accelerations, combined with very small driving force exerted by the vibrator, could also be achieved if resonance takes place at high frequencies Ω, eq. (19).

In his PhD thesis (Ref. 9: Y. Qui: *Investigation of Internal Damping in Carbon Fiber and Steel Cables*, The University of New Mexico, Albuquerque, 2013) the author measured damping coefficient ç of a 3 mm carbon-fiber and steel cables of different length (0.2 to 0.5 m), subject to tension force of 100-600 N, at temperatures 4° C. and 20° C. It was found that damping is increased by decreasing the tension force, by decreasing cable's length, by decreasing the lay angle (i.e., the number of twists in a cable), and by decreasing the temperature. The most influential factor seems to be the tension force. When put in tension at 500-600 N, the cable damping at room temperature can be made as small as 1% or less, i.e., ç≤0.01 in both carbon-fiber and steel cables tested, and as big as 0.05 for tension forces of 100 N. This possibility of easily adjusting/tuning the damping coefficient, the key-role player in the dynamic response of all strings, see eq. (16), as well as their strength, makes smooth, coated cables/wire ropes of circular cross section an excellent candidate for production of the harp assembly.

To illustrate the use of the above analysis, consider vibration of a L=4 m long, d=2 E−3 m (2 mm) in diameter of wet strings of unit weight m=2.5 E−02 kg/m each stretched with tension force S=40 N in a harp operating at the gas velocity between the strings U=2 m/s. Let its upper end be set in a vibrating motion y(L, t)=ε sin Ωt, where ε is the amplitude while Ω (in radians per second) is frequency matching the vortex-shedding frequency $f_s$ (Hz) and the natural frequency of the string $f_n$, i.e., $\Omega = 2\pi f_s = 2\pi f_n$. Assuming the common value of Strouhal number St=0.2, one finds that $$f_s = \frac{U\,S_t}{d} = 200\,\text{Hz}.$$

From (8), (9) one finds that the string vibrates in the n=40-th mode. Assuming that the amplitude ε=1 E−05 m, and that the damping ratio of the string is ζ=0.02, the maximum string vibration amplitude, from (16) is found to be 0.16 mm (i.e., as much as 16 times larger than the amplitude at the top of strings) and acceleration of the beam holding the strings is found from (20) to be $a_s = 15.78$ m/s². The slope on top of the string, eq. (17), is sin θ=0.005 such that the horizontal projection of the string tension force is $SH_1 = 0.2$ N, eq. (18). One meter of staggered strings wrapped in two rows around beam 2 with the pitch to diameter ratio equal to, say, $$\frac{P}{d} = 2$$

accommodates k=500 strings per meter (on both sides of beam 2), FIGS. 1 and 2, such that the total horizontal force in all the strings in both rows is SH=100 N/m. Assuming that the mass of the beam is $m_B = 10$ kg/m, from eq. (21) one finds that the total force to be exerted by the vibrator is only F=258 N/m.

What is claimed is:

1. A device for treating a gas traversing between longitudinally extending circular strings, said device comprising:
    one or more assemblies positioned in one row or in two or more parallel rows, each assembly comprising one or more parallel rows of longitudinally extending circular strings tensed between two opposing members, where one of the members is capable of latitudinal displacement and the other member is fixed;
    wherein a vibrator with adjustable speed and force is coupled at a characteristic frequency with the member capable of latitudinal displacement; and
    wherein a desired frequency of the vibrator is maintained at a value equal to a frequency of gas vortices shedding off said strings.

2. The device of claim 1, wherein the frequency of the vortices shedding off the strings ($f_s$, in Hz) is calculated as $$f_s = \frac{U\,St}{d},$$

where U is the velocity of gas between the strings, d is the diameter of strings, and St is a Strouhal number, wherein St is 0.2.

3. The device of claim 2, further comprising:
    a sensor measuring the flow velocity of the gas traversing between the strings; and
    a frequency regulator communicating with the sensor and adjusting the frequency of the vibrator to maintain the frequency of the strings at a value equal to the frequency of gas vortices shedding off the strings.

4. The device of claim 1, wherein the strings within an assembly are positioned in two or more rows parallel to each other so that the strings in each row are positioned medially between the strings of the adjacent assembly or assemblies.

5. The device of claim 1, wherein the strings are formed from a hydrophilic material.

6. The device of claim 1, wherein the strings are formed from a hydrophobic material.

7. The device of claim 1, further comprising:
a plurality of frames projecting from a support member, the support member defining a liquid supply conduit configured to receive a liquid, such that each of the strings is connected to the liquid supply conduit to receive the liquid and pass the liquid therealong as the strings vibrate.

8. The device of claim 7, wherein the liquid is water.

9. The device of claim 8, wherein the strings are formed from a hydrophilic material.

10. The device of claim 8, wherein the strings are formed from a hydrophobic material.

11. A method for treating a gas traversing between a plurality of longitudinally extending circular strings positioned in one or more rows, said method comprising:
providing a device in accordance with claim 1;
positioning the device to allow for a traversal of gas through gaps between the strings, whereby the traversal of gas causes the strings to vibrate and thus generate a plurality of gas vortices shedding off said strings; and
setting the vibrator to maintain a natural oscillation frequency of the strings at a value equal to a frequency of the gas vortices shedding off said strings.

12. The method according to claim 11, wherein the frequency of the vortices shedding off the strings ($f_s$, in Hz) is calculated as $$f_s = \frac{U\,St}{d},$$

where U is the velocity of gas between the strings, d is the diameter of strings, and St is a Strouhal number, wherein St is 0.2.

13. The method according to claim 12, further comprising:
informing the vibrator with measurements concerning changes in a flow velocity of the gas traversing between the strings; and
adjusting the frequency of the vibrator in accordance with the changes in the flow velocity of the gas so that the oscillation frequency of the strings is maintained at a value equal to the frequency of gas vortices shedding off the strings.

14. The method according to claim 13, wherein a sensor for measuring the flow velocity of the gas traversing between the strings is coupled with the device, and a regulator of the vibrator's frequency is also coupled with the device, wherein the sensor informs the regulator of the changes in said flow velocity.

15. The method according to claim 11, wherein the traversing gas is laden with liquid particulates, the method further comprising:
collecting the liquid particulates from the traversing gas.

16. The method according to claim 11, wherein the traversing gas is laden with solid particulates, the method further comprising:
flowing a liquid along the strings to allow contact between the liquid and the solid particulates to remove the solid particulates from the traversing gas.

17. The method according to claim 11, further comprising:
flowing a liquid along the strings so that the liquid is impacted by the traversing gas and thus achieving a heat transfer by direct contact between the gas traversing between the strings and the liquid flowing along the strings.

* * * * *